United States Patent [19]
Tseng

[11] Patent Number: 5,969,344
[45] Date of Patent: Oct. 19, 1999

[54] PHOTO DETECTOR FOR A DATA INPUT DEVICE

[76] Inventor: Hsin-Te Tseng, 4F, No. 19, Shih-Chien St., Pei-Tou, Taipei, Taiwan

[21] Appl. No.: 09/027,316

[22] Filed: Feb. 20, 1998

[51] Int. Cl.[6] .................................................. G01D 5/34
[52] U.S. Cl. ...................... 250/231.13; 250/239
[58] Field of Search ..................... 250/231.13, 231.14, 250/231.16, 231.17, 231.18, 239, 216; 356/373, 460; 33/707

[56] References Cited

U.S. PATENT DOCUMENTS

4,948,969  8/1990  Yokota ..................................... 250/239

*Primary Examiner*—Edward P. Westin
*Assistant Examiner*—Kevin Pyo
*Attorney, Agent, or Firm*—Rosenberg, Klein & Bilker

[57] ABSTRACT

A photo detector which includes a wheel turned with a revolving shaft, the wheel having a plurality of light permeable portions and light tight portions alternatively arranged around the revolving shaft, a light source controlled to emit light onto the wheel, and a photo receiver element having a set of photo sensor chips adapted to receive light from the light source through the light permeable portions of the wheel, the photo receiver element having at least two sloping surface portions at a light receiving side thereof around each of the photo sensor chips for refracting proximity light to prevent an interference of proximity light.

3 Claims, 12 Drawing Sheets

PHOTO DETECTOR FOR A DATA INPUT DEVICE

BACKGROUND OF THE INVENTION

The present invention relates to a photo detector for a data input device for example an optical mouse, and more particularly to such a photo detector which effectively eliminates interference of proximity light from photo sensor chips, so as to improve signal receiving accuracy.

Figure 1:
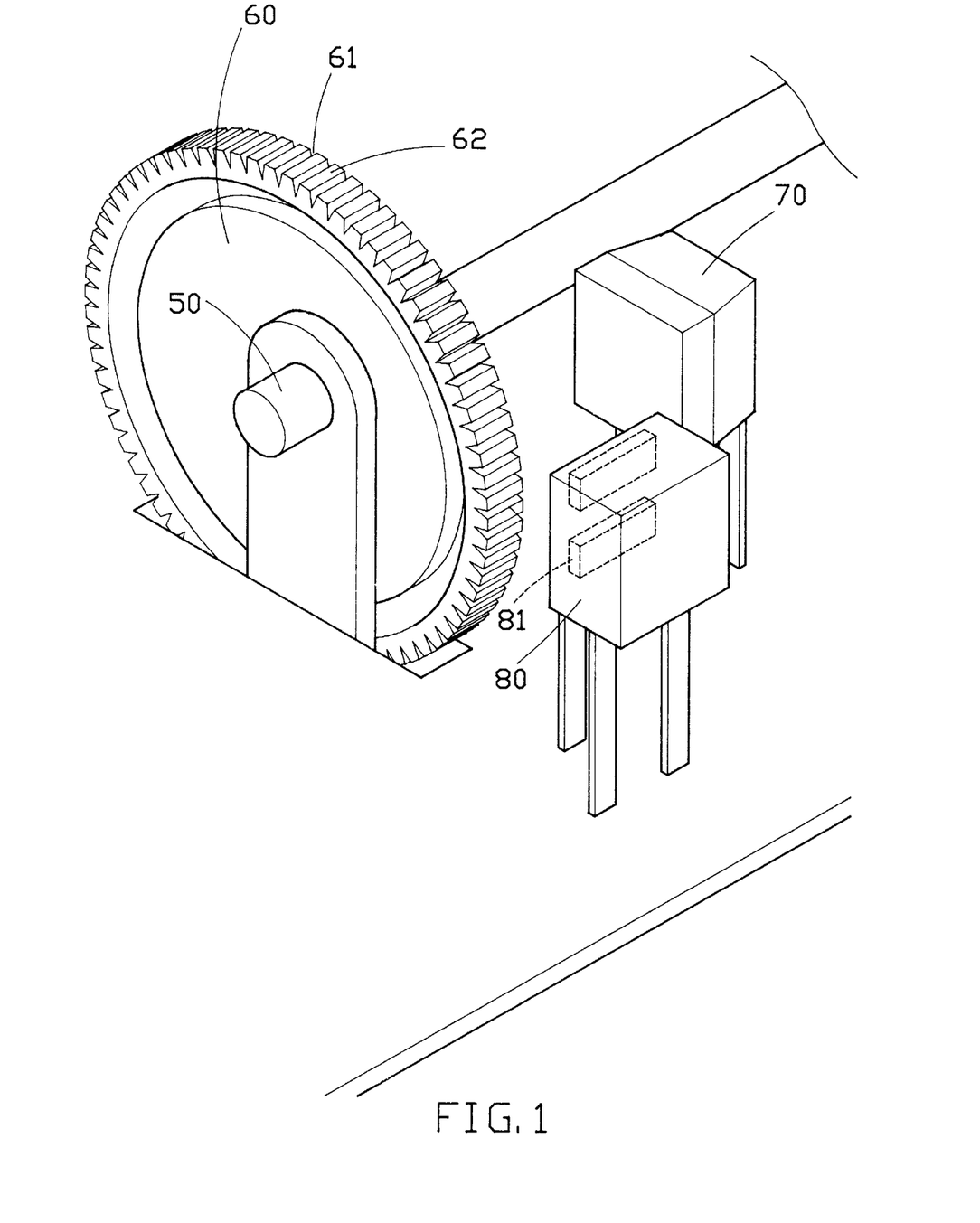
FIG. 1 shows a photo detector according to the prior art.
Figure 2:
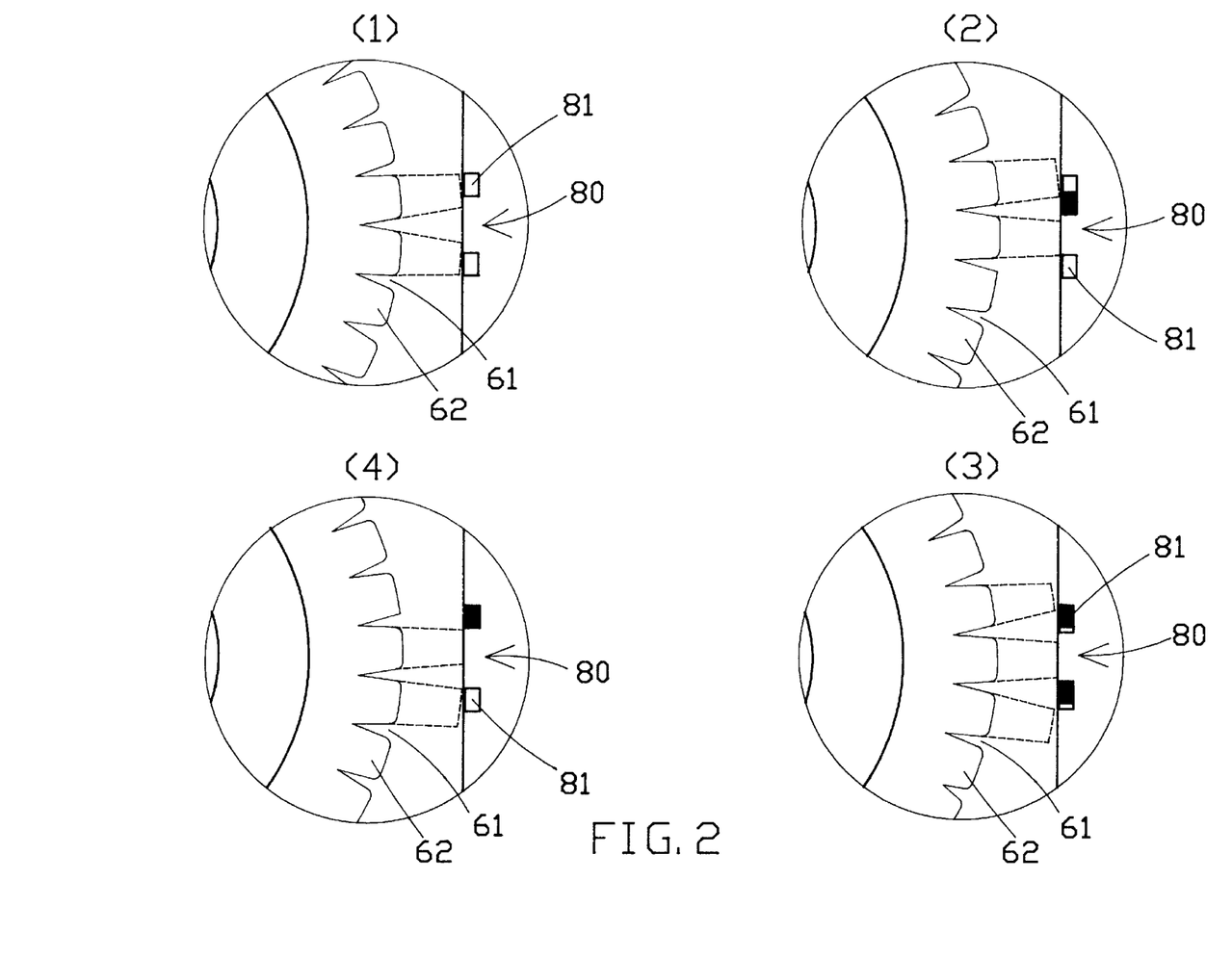
FIG. 2 shows four signals produced upon a continuous rotation of the wheel according to the prior art.
Figure 3:
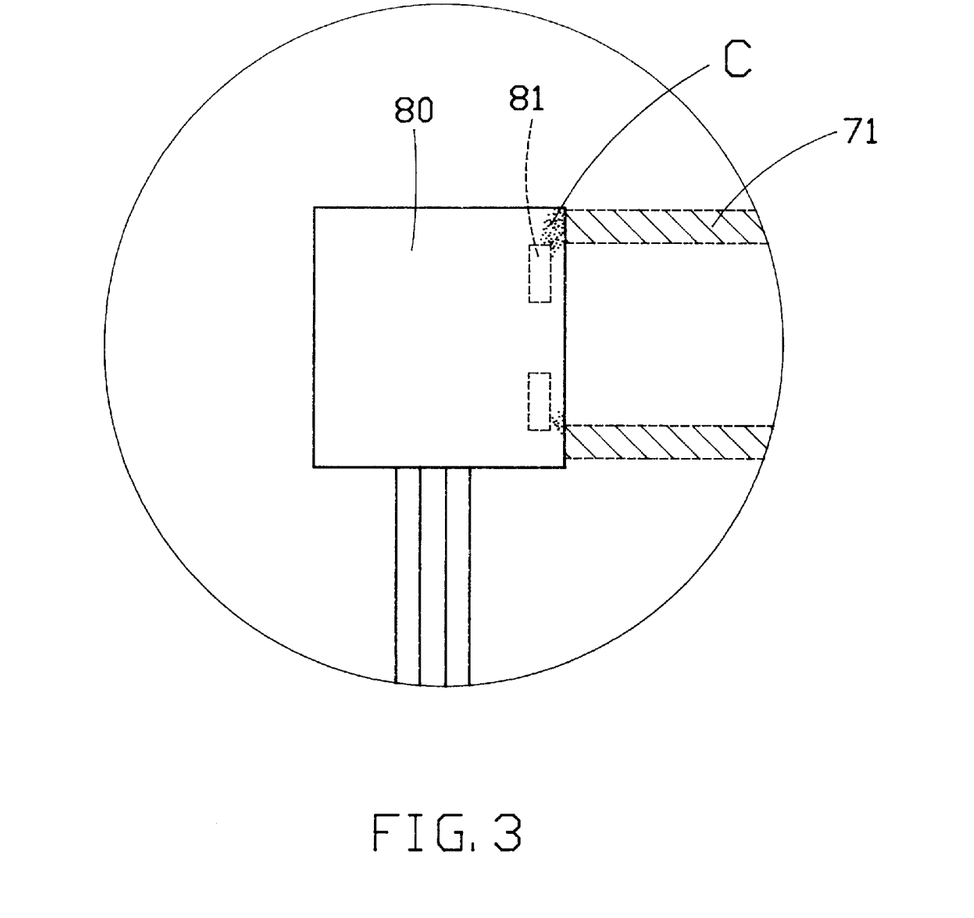
FIG. 3 shows an interference of diffused light at the photo receiver element according to the prior art.
Figure 4:
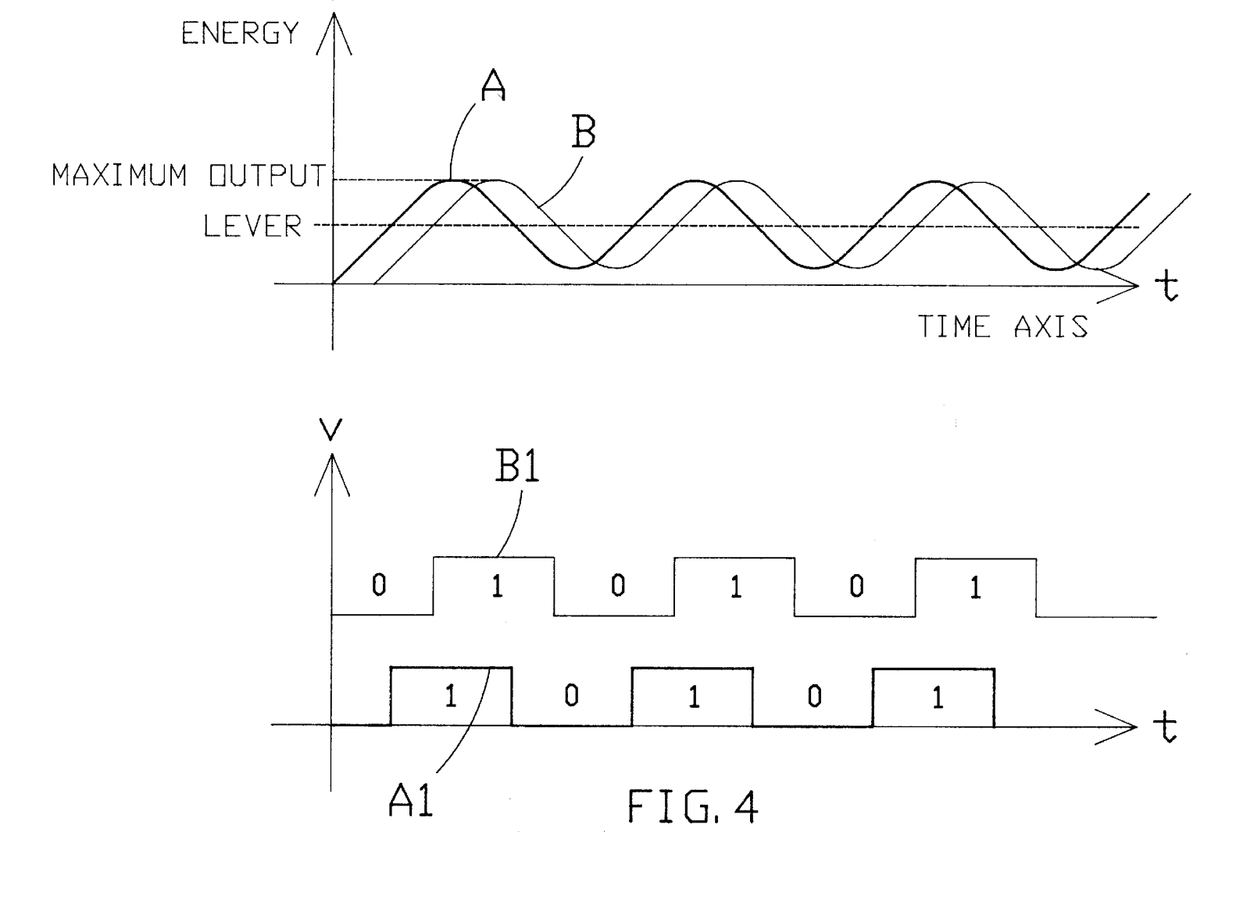
FIG. 4 is a schematic drawing showing theoretical sine wave and square wave generated by the photo receiver element according to the prior art.
Figure 4A:
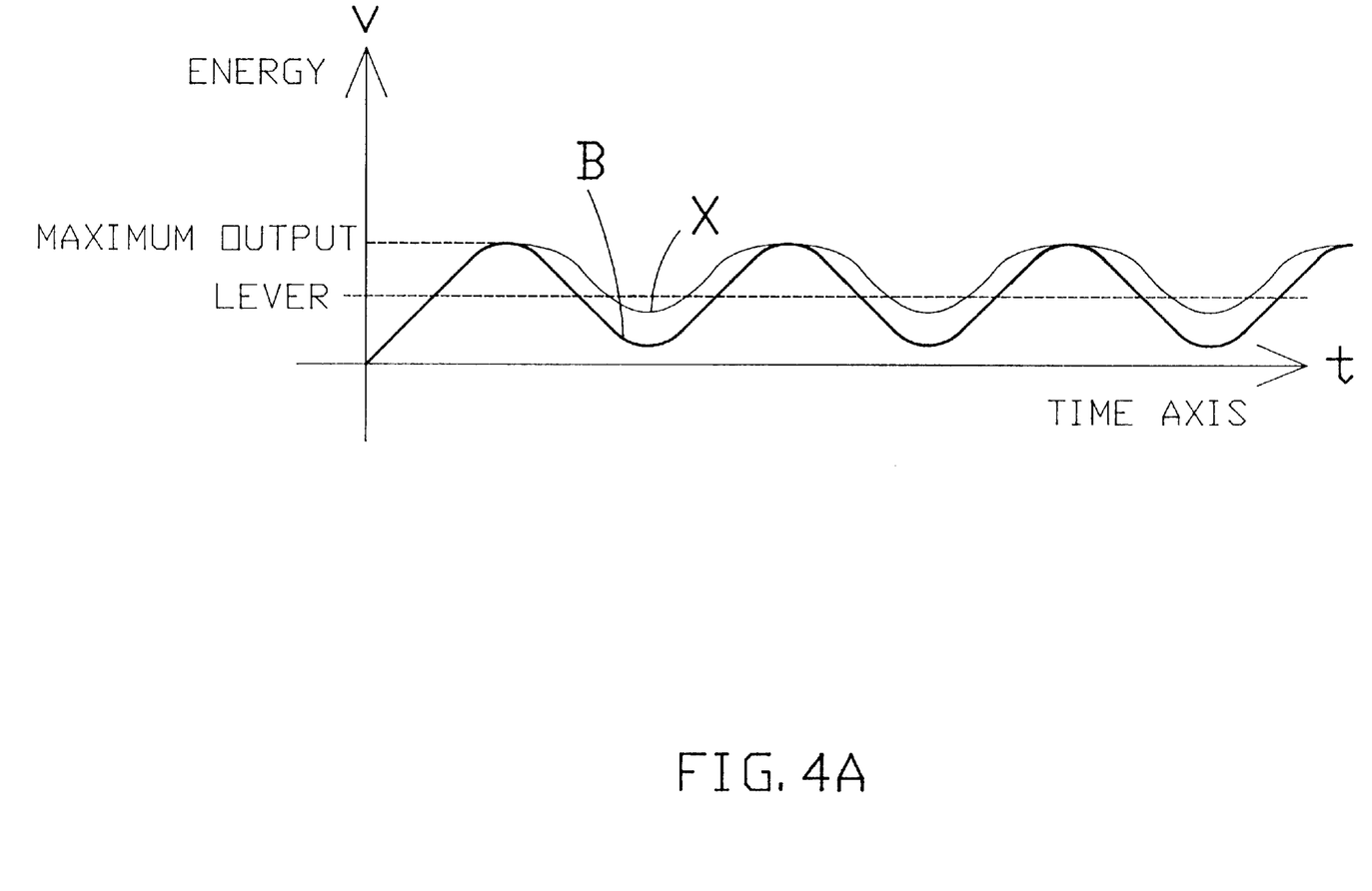
FIG. 4A is a schematic drawing showing actual sine wave and square wave generated by the photo receiver element according to the prior art.

A photo encoder used in a mouse, as shown in FIG. 1, is generally comprised of at least one encoding grid wheel 60 turned with a revolving shaft 50, the wheel 60 having light permeable portions 61 and light tight portions 62 alternatively arranged around the periphery, a light source 70, and a photo receiver element 80. The photo receiver element 80 comprises a set of photo sensor chips 81 adapted to receive light from the light source 70 through the light permeable portions 61 of the wheel 60. When the wheel 60 is turned with the revolving shaft 50, the light permeable portions 61 and the light tight portions 62 are moved to cut through light from the light source 70, causing working light beams to be produced. When the photo chips 81 receive a working light beam an energy is produced. When the wheel 60 is continuously turned, sine waves are obtained through a wave form monitor, and four signals (0,0);(0;1);(1;1);(1;0) are obtained through a rectifier circuit (see FIG. 2). However, because the light receiving side of the photo receiver element 80 and the light emitting side of the light source are of a planar design, a diffused light will be produced, thereby causing an interface. Referring to FIGS. 3 and 4, when the wheel 60 is turned, the photo sensor chips 81 are induced by working light beams from the light source 70 to produce sine waves A;B, causing a rectifier circuit to produce square waves A1;B1. When working light beams 71 enter the photo receiver element 80, diffused light C is produced, causing an interference to the photo sensor chips 81. Referring to FIG. 4A, the waveform B is theoretically a sine wave, however the photo sensor chips 81 are energized by diffused light to produce a sine wave X before arrival of working light beams 71. Because of the effect of diffused light C, the photo sensor chips 81 are induced to produce an energy before arrival of working light beams 71, and diffused light C causes the photo sensor chips 81 unable to release energy after leaving of working light beams 71. Because of the aforesaid problem, the wave form monitor cannot accurate obtain sine wave energy values from the sine waves A;B. and the rectifier circuit cannot produce square waves exactly same as the square waves A1;B1.

SUMMARY OF THE INVENTION

The present invention has been accomplished to provide a photo detector which eliminates the aforesaid problem. According to the present invention, the photo receiver element has at least two sloping surface portions at a light receiving side thereof around each photo sensor chip thereof for refracting proximity light to prevent an interference of proximity light.

DETAILED DESCRIPTION OF THE PREFERRED EMBODIMENT

Referring to FIGS. from 5 to 8, a photo detector for a data input device in accordance with the present invention is generally comprised of a light source 1, a wheel 2, and at least one photo receiver element 3.

Figure 5:
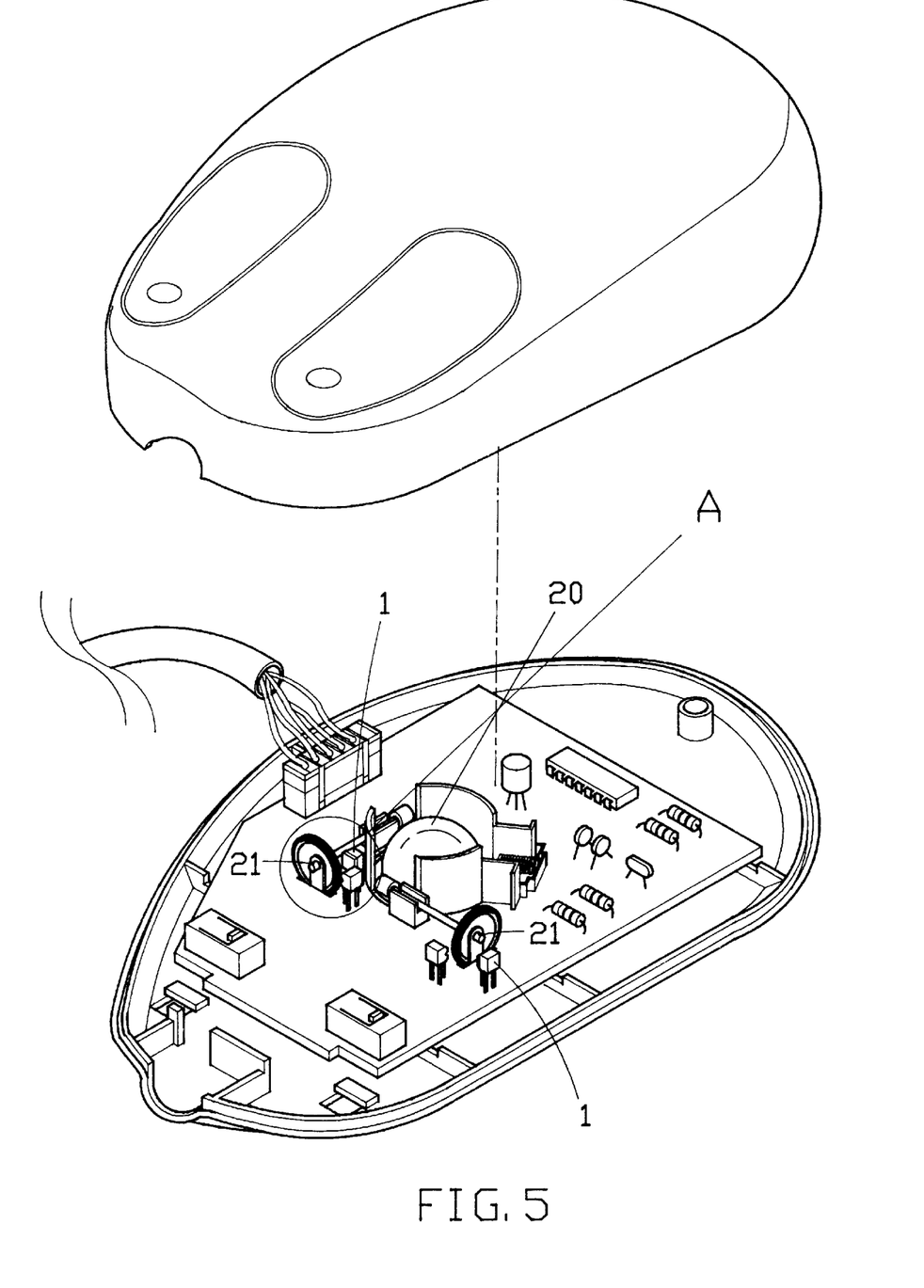
FIG. 5 shows a photo detector installed in an optical mouse according to the present invention.
Figure 5A:
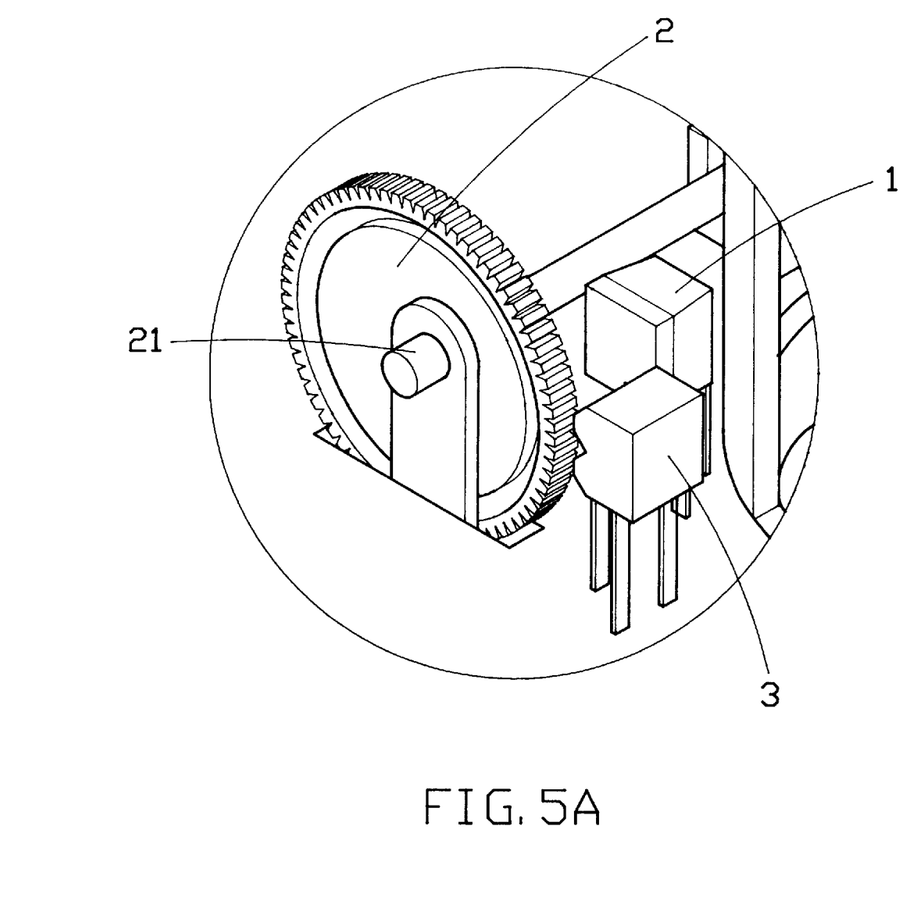
FIG. 5A is an enlarged view of a part of FIG. 5, showing the arrangement of the photo detector.
Figure 6:
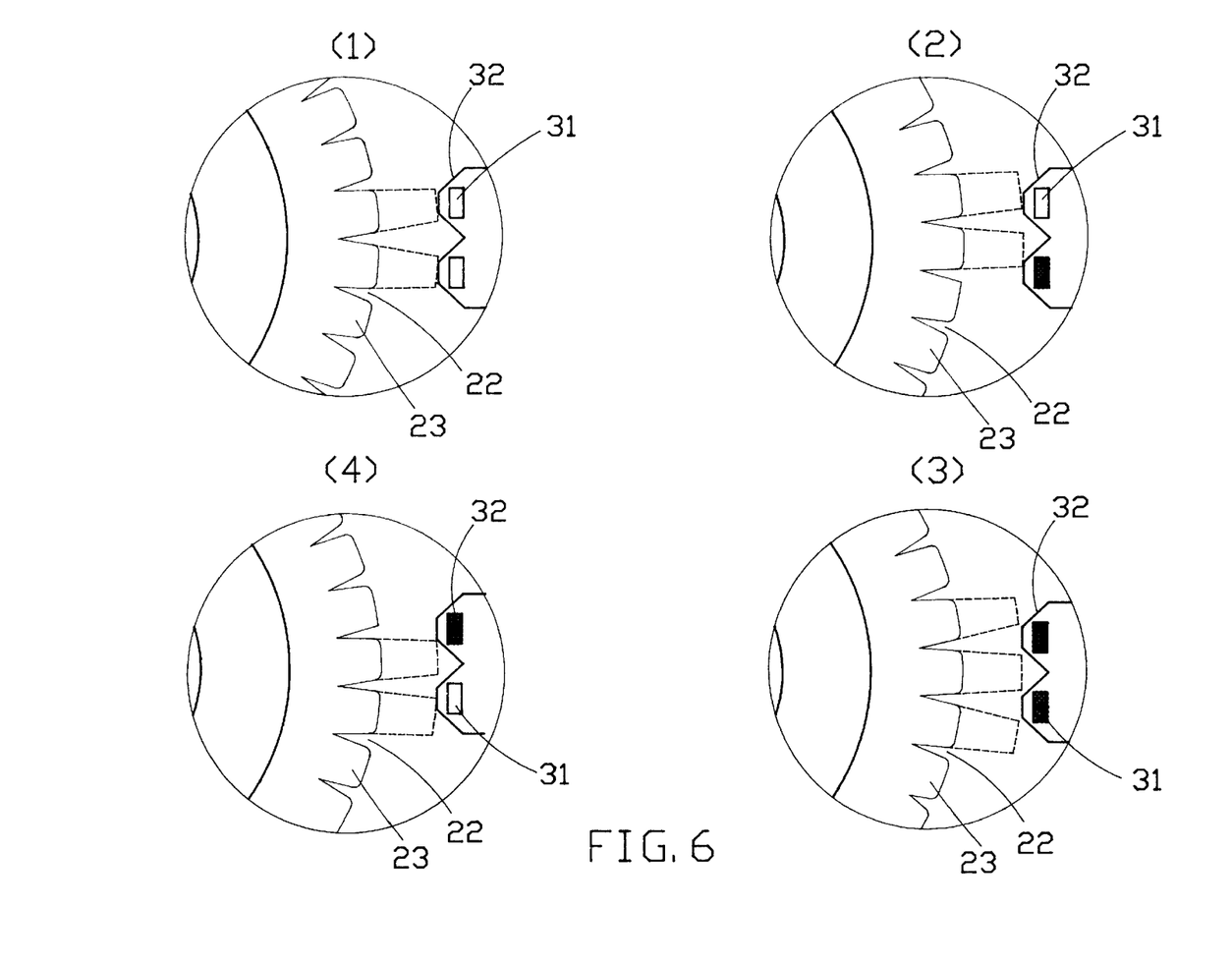
FIG. 6 shows four signals produced upon a continuous rotation of the wheel according to the present invention.
Figure 7:
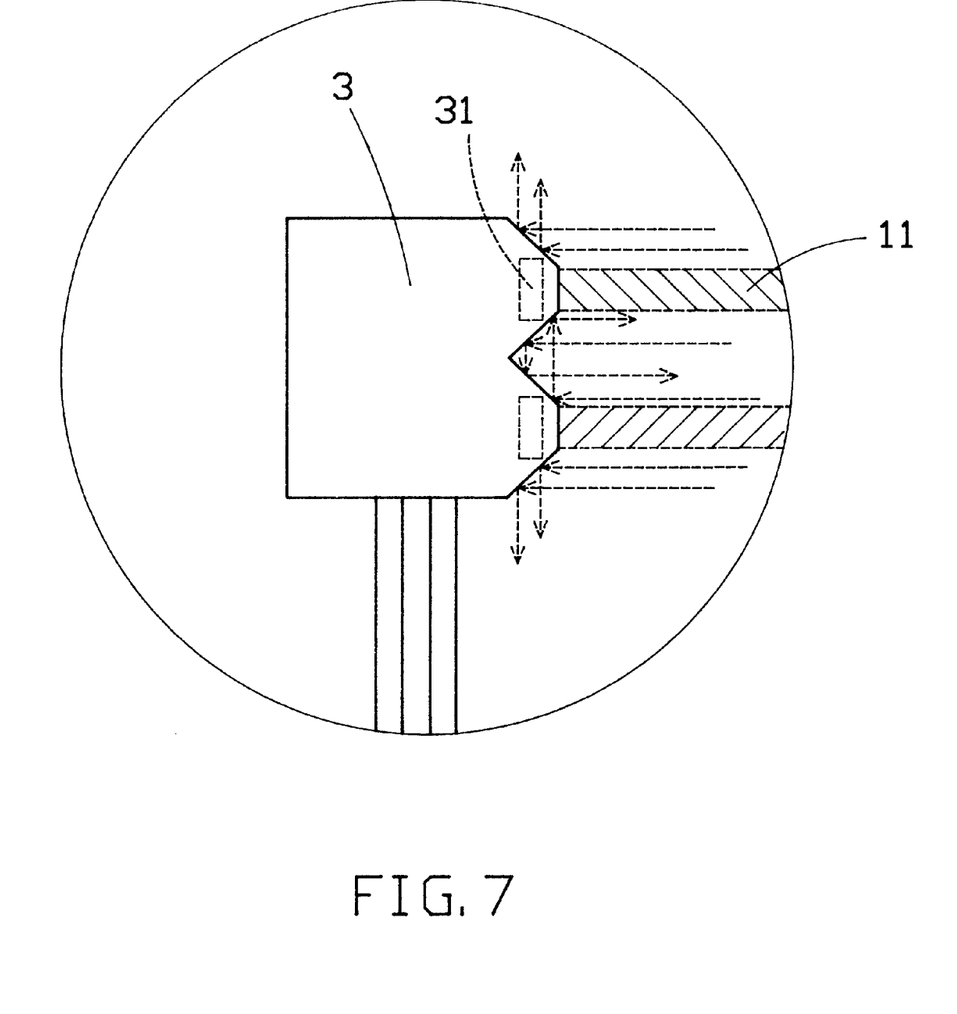
FIG. 7 shows working light beams projected onto the photo sensor chips of the photo receiver element according to the present invention.
Figure 8:
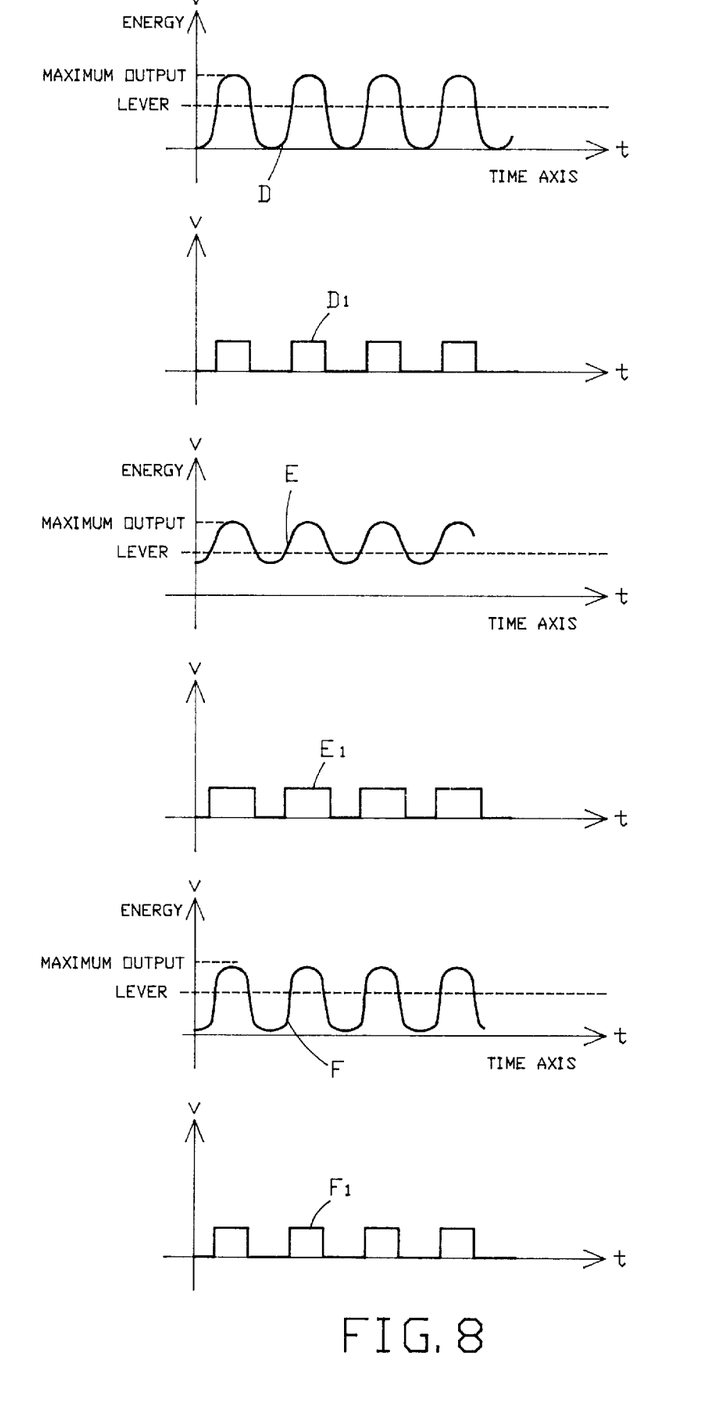
FIG. 8 is a comparison chart showing sine waves and square waves generated between the present invention and the prior art.

The light source 1 is disposed adjacent to the wheel 2, and controlled to emit light onto the wheel 2. The wheel 2 is fixedly mounted on a revolving shaft 21, which is driven to turn on its own axis by a driving member for example a ball 20. The wheel 2 comprises a plurality of light permeable portions 22 and a plurality of light tight portions 23 alternatively arranged around the periphery. When the ball 20 is turned with the hand, the wheel 2 is turned with the revolving shaft 21, thereby causing the light permeable portions 22 and the light tight portions 23 to pass across the light beam from the light source 1. The photo receiver element 3 is made from light permeable material and disposed adjacent to the wheel 2, having two vertically spaced photo sensor chips 31 adapted to receive working light beams 11, which passes from the light source 1 through the light permeable portions 22 of the wheel 2. The photo receiver element 2 comprises at least two sloping surface portions 32 at its light receiving side around each photo sensor chip 31. The sloping surface portions 32 may be coated with a layer of light reflecting or eliminating material, so that proximity light can be refracted outwards by the sloping surface portions 32 when working light beams 11 are projected onto the light receiving side of the photo receiver element 3 (see FIG. 7), and the encoder can then eliminate the interference of proximity light from the signal.

When the wheel 2 is turned with the revolving shaft 21, light from the light source 1 is alternatively cut by the light permeable portions 22 and light tight portions 23 of the wheel 2, causing working light beams 11 to be produced and emitted onto the light receiving side of the photo receiver element 3. When a working light beam 11 touches one photo sensor chip 31, an energy is produced. When the wheel 2 is continuously turned, sine waves are obtained through a wave form monitor, and four signals (0,0);(0;1);(1;1);(1;0) are obtained through a rectifier circuit (see FIG. 6).

Referring to FIG. 8 again, when the light permeable portions 22 and light tight portions 23 of the wheel 2 cut through light from the light source 1 alternatively, a sine wave is obtained through a wave form monitor, and square waves are obtained through a rectifier circuit, wherein waveforms D;D1 are theoretically sine wave and square wave; waveforms E;E1 are sine wave and square wave; waveforms F;F1 are sine wave and square wave.

Referring to FIGS. 7 and 8 again, when working light beams 11 are projected onto the light receiving side of the photo receiver element 3, proximity light is refracted outwards by the sloping surface portions 32 of the photo receiver element 3, therefore no energy is produced due to an interference when working light beams 11 do not touch the photo sensor chips 31; when the working light beams 11 are removed from the photo sensor chips 31, energy is released. Therefore, waveforms produced at the photo sensor chips 31 are obtained approximately equal to the waveforms E;E1, so that the encoder can process the interference of proximity light, so as to obtain accurate signals.

Figure 9:
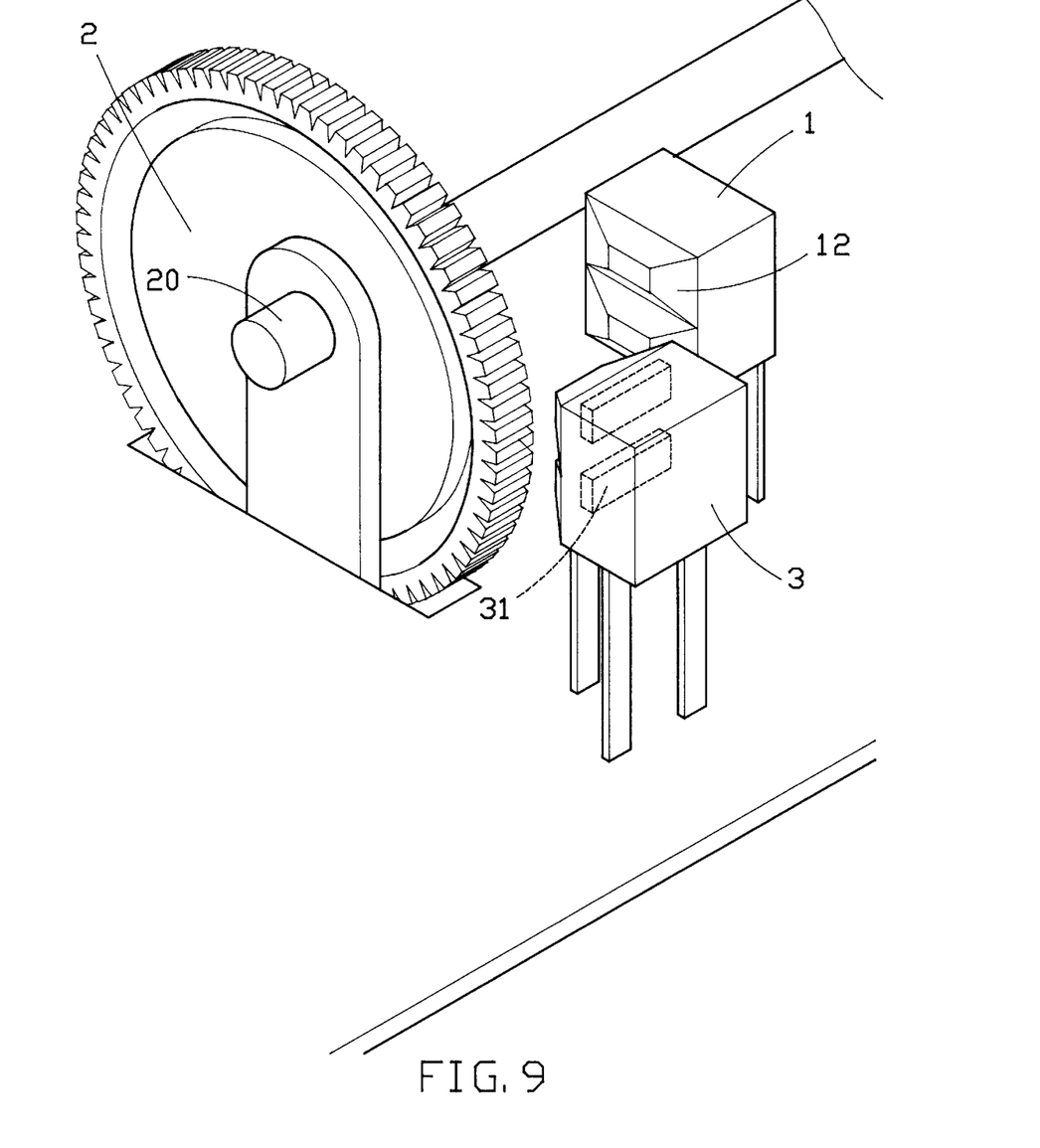
FIG. 9 is a perspective view in an enlarged scale of the photo detector according to the present invention.

Referring to FIG. 9, the light source 1 comprises at least two sloping surface portions 12 at its light emitting side, so that the light source 1 can be controlled to emit one or multiple light beams onto the photo sensor chips 31 on the photo receiver element 3.

Figure 10:
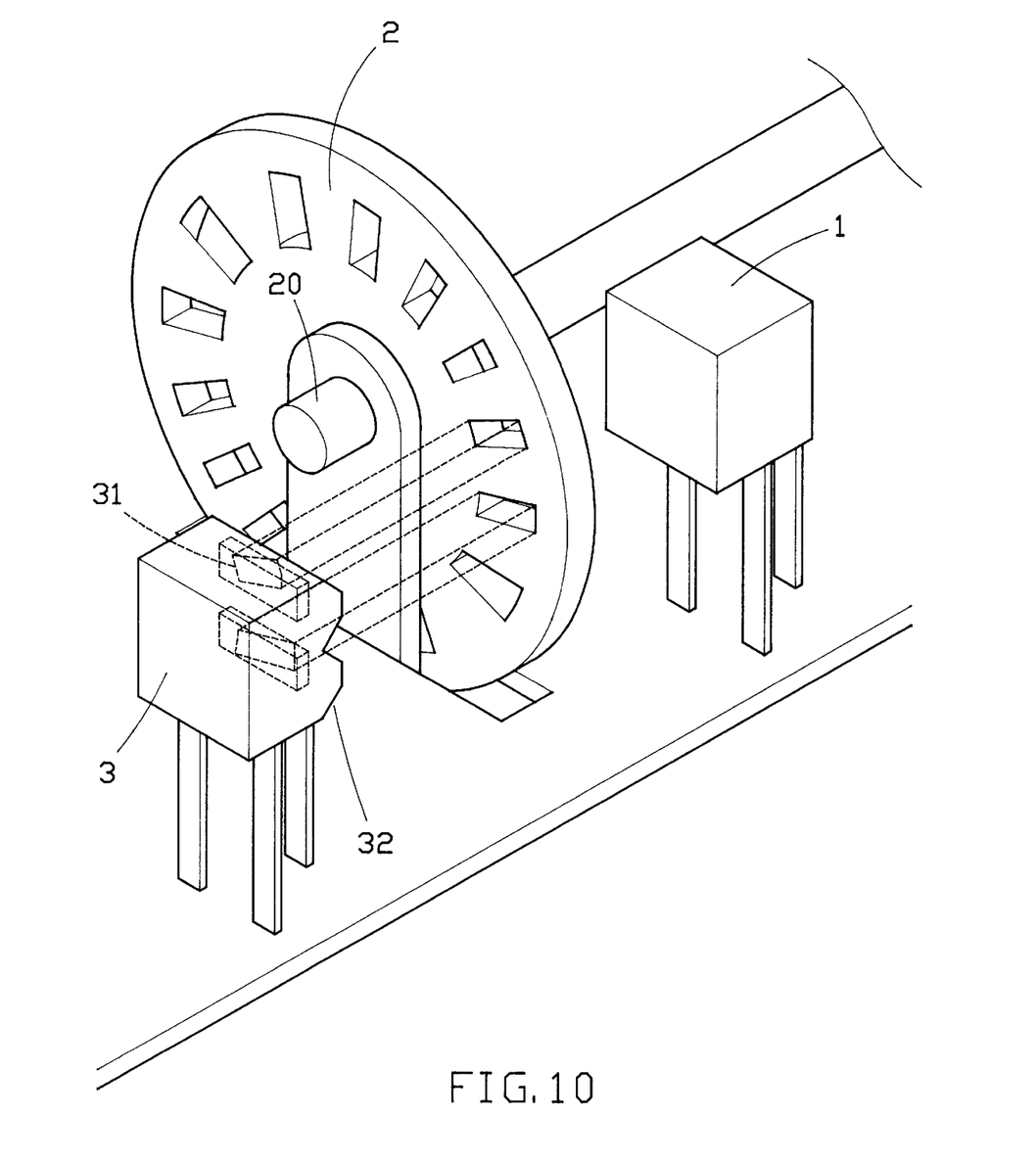
FIG. 10 is a perspective view of an alternate form of the photo detector according to the present invention.

FIG. 10 shows an alternate form of the present invention, in which the light source 1 and the photo receiver element 3 are spaced from the wheel 2 at two opposite sides.

It is to be understood that the drawings are designed for purposes of illustration only, and are not intended as a definition of the limits and scope of the invention disclosed.

What the invention claimed is:

1. A photo detector comprising a wheel turned with a revolving shaft, said wheel having a plurality of light permeable portions and light tight portions alternatively arranged around said revolving shaft, a light source controlled to emit light onto said wheel, and a photo receiver element having a set of photo sensor chips adapted to receive light from said light source through said light permeable portions of said wheel, wherein said photo receiver element comprises at least two sloping surface portions at a light receiving side thereof around each of said photo sensor chips for refracting proximity light to prevent an interference of proximity light.

2. The photo detector of claim 1, wherein said at least two sloping surface portions are coated with a layer of light reflecting material.

3. The photo detector claim 1, wherein said light source comprises at least two sloping surface portions at the periphery corresponding to the at least two sloping surface portions around each photo sensor chip on said photo receiver element.

* * * * *